US008355411B2

(12) United States Patent
Simonsson et al.

(10) Patent No.: US 8,355,411 B2
(45) Date of Patent: Jan. 15, 2013

(54) METHOD AND ARRANGEMENT FOR HANDOVER IN A RADIO ACCESS NETWORK

(75) Inventors: Arne Simonsson, Gammelstad (SE);
Anders Furuskär, Stockholm (SE);
Harald Kallin, Sollentuna (SE);
Magnus Lindström, Spånga (SE);
Walter Müller, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 696 days.

(21) Appl. No.: 12/307,257

(22) PCT Filed: Jul. 3, 2006

(86) PCT No.: PCT/SE2006/000810
§ 371 (c)(1),
(2), (4) Date: Dec. 4, 2009

(87) PCT Pub. No.: WO2008/004914
PCT Pub. Date: Jan. 10, 2008

(65) Prior Publication Data
US 2010/0069071 A1    Mar. 18, 2010

(51) Int. Cl.
*H04J 4/00*    (2006.01)
*H04L 12/28*    (2006.01)

(52) U.S. Cl. .................. 370/436; 370/341; 370/431

(58) Field of Classification Search .................. 370/341, 370/431, 436
See application file for complete search history.

(56) References Cited

U.S. PATENT DOCUMENTS

| | | | |
|---|---|---|---|
| 5,355,515 | A | 10/1994 | Sicher |
| 7,139,575 | B1 * | 11/2006 | Chen et al. ............... 455/437 |
| 2006/0056354 | A1 * | 3/2006 | Vasudevan et al. ........ 370/332 |
| 2006/0092876 | A1 * | 5/2006 | Kwak et al. ............... 370/329 |
| 2007/0105561 | A1 * | 5/2007 | Doetsch et al. ........... 455/450 |
| 2008/0101211 | A1 * | 5/2008 | Rao ........................... 370/206 |

FOREIGN PATENT DOCUMENTS

| | | |
|---|---|---|
| CN | 1103242 A | 5/1995 |
| CN | 1731886 A | 2/2006 |
| CN | 1794865 A | 6/2006 |

(Continued)

OTHER PUBLICATIONS

Supplementary European Search Report, EP Application No. EP 06 75 8006, Aug. 10, 2010.

(Continued)

*Primary Examiner* — Kenny Lin
(74) *Attorney, Agent, or Firm* — Myers Bigel Sibley & Sajovec, P.A.

(57) ABSTRACT

An object of the present invention is to provide a mechanism for handling a handover in a more efficient way. The invention relates to a method in a mobility controller (180) in a radio access network for preparing a handover. The method comprises the following steps to be taken during data transmission between a mobile terminal (140) and a source base station (120), before the handover: Sending a request to a candidate base station (122), which request aims at measuring and reporting timing alignment to be used by the mobile terminal (140) when communicating with the destination base station (122) after the handover, if the candidate base station becomes the destination base station (122) after the handover; receiving a report from the destination base station (122) comprising said requested timing alignment; and when the destination base station (122) is selected among the at least one candidate base stations, sending a message to the mobile terminal (140) to use said timing alignment received from the destination base station (122) when communicating with the destination base station (122) after the handover.

16 Claims, 5 Drawing Sheets

FOREIGN PATENT DOCUMENTS

WO  WO 94/21057 A1  9/1994
WO  WO 2006/131067 A1  12/2006

OTHER PUBLICATIONS

First Office Action with English language translation, Chinese Patent Application No. 200680055160.X, Sep. 26, 2010.

TSG-RAN WG3 Meeting #52; R3-060725; Shanghai, China, May 8-12, 2006; "Congestion Status Indication in E-UTRA", 3 pages.

3GPP TSG RAN WG2 Ad Hoc Meeting; R2-061892; Cannes, France Jun. 27-30, 2006; "Uplink Timing Acquisition in LTE Handover", 2 pages.

* cited by examiner

METHOD AND ARRANGEMENT FOR HANDOVER IN A RADIO ACCESS NETWORK

TECHNICAL FIELD

The present invention relates generally to a method and an arrangement in a mobility controller comprised in a radio access network and a method and an arrangement in a candidate base station comprised in the radio access network. In particular it relates to preparation of a handover in the radio access network.

BACKGROUND OF THE INVENTION

In modern mobile communications systems a mobile terminal such as a mobile phone, is free to move and connect from one cell to another within the mobile communication system. If a mobile terminal does not have an ongoing call, the entering in a new cell only results in registering to the new cell. If a mobile terminal is handling a call during entering the new cell, the call must also be switched to the new cell by a way which causes as little disturbance to the call as possible. The process of cell change during an ongoing call is called a handover, which implies a change of serving cell. To be connected to the best cell is crucial for both capacity and cell edge bit rate. Because of the varying quality of the radio environment the best cell can change rather frequently. Median best cell duration is can be in the range 0.5-4 seconds. Much shorter durations are common at the cell edge.

To be able to detect a need for a handover and to select a suitable destination cell for the handover, various kinds of measurements are required to determine the connection quality and field strength levels of the neighbouring cells. The handover in turn involves measurement and signalling procedures, which procedures are very time consuming. The time between a new best cell is detected and the mobile terminal is connected to that cell is here denoted the execution time. To improve coverage, capacity and quality, it is of interest to minimize the execution time.

A typical handover procedure can be divided into a preparation phase and an execution phase. The basis for handover is measurements by the mobile terminal on signals from the cells which is performed in the preparation phase. A mobility controller in the network orders the mobile terminal to measure on a defined set of reference signals that are configured as neighbor cells. Typically around 20 neighboring cells are configured to cover handover possibilities needed for coverage reasons in the whole cell area. There are also self configuration algorithms that are based on mobile measurements. The terminal needs to assign resources to listen to reference signals in e.g. Code Division Multiple Access (CDMA). In Global System for Mobile communication (GSM), Time Division Multiple Access (TDMA) and Personal Digital Cellular (PDC) the measurements are sent periodically from the mobile terminals to the network that filters and applies a hysteresis, so that a handover is only performed if the new best cell is at least a certain margin better than the current cell. In Wideband CDMA (WCDMA) the mobile terminal performs filtering and hysteresis and sends a triggering event to the network. The hysteresis and filters are typically, e.g. in GSM and WCDMA, applied to avoid too frequent handovers. The execution phase then starts, during which execution phase the data transfer is interrupted. During this interruption and execution phase the network sends a handover command to the mobile terminal, the command comprises information about which the destination cell is and which destination base station to communicate with selected among candidates. The mobile terminal then listens to the selected destination base station which destination base station broadcasts system information. System information is in this document defined as resource assignment for accessing the destination cell. This may take some time since the mobile terminal has to wait for the system information to be broadcasted. Based on the obtained system information, random access can be performed. Random access is "contention-based"; i.e. the mobile terminal transmits on a channel being common for many mobile terminals wishing to enter the destination cell. Since more than one mobile terminal is competing about resources/channels, collision may appear which may lead to unsuccessful access and that the mobile terminal must try again. Further in the execution phase and during the interruption of data transmission, measurements of timing alignment and power that mobile terminal shall use for transmission when communicating with the destination base station after the handover, are performed by the destination base station and the value of the timing alignment and required power is sent from the destination base station to the mobile terminal. The value of timing alignment may e.g. be defined by the destination base station by measuring mobile terminal transmission signals and decide how much the mobile terminal has to adjust its point of time of transmission to synchronize to the point of time when the destination base station requires to receive the mobile terminal transmission. Further in the execution phase and during the interruption of data transmission, a scheduling request is sent from the mobile terminal to the destination base station and a scheduling grant is sent from the destination base station to the mobile terminal. Thereafter the handover execution is finished and the transfer of data can continue. The execution phase is very time consuming which makes the interruption of data transmission long. This in turn may lead to reduced end user perception. Furthermore, a slow handover execution gives a poor cell edge bit rate.

To improve the handover not only downlink measurements may be used. In TDMA and PDC, an uplink measurement on a handover candidate is performed after triggered but before execution to verify the downlink measurement. Even though this solution improves the time of handover execution, the process is still quite time consuming.

SUMMARY OF THE INVENTION

It is therefore an object of the present invention to provide a mechanism for handling a handover in a more efficient way.

According to a first aspect of the present invention, the object is achieved by a method in a mobility controller for preparing a handover. The mobility controller is comprised in a radio access network. The radio access network comprises a source radio base station, at least one candidate base station being a candidate for being selected as a destination radio base station and a mobile terminal adapted to communicate with source radio base station. The mobile terminal further is adapted to switch to communicate with the destination radio base station after the handover. The method comprises the following steps to be taken during data transmission between the mobile terminal and the source base station, before the handover: Sending a request to each of the at least one candidate base stations, which request aims at measuring and reporting timing alignment, which timing alignment is to be used by the mobile terminal when communicating with the destination base station, if the candidate base station becomes the destination base station after the handover; receiving a report from each of the at least one candidate base stations comprising said requested timing alignment; and when the destination base station is selected among the at least one candidate base stations, sending a message to the mobile terminal to use said timing alignment, received from the destination base station, when communicating with the destination base station after the handover.

According to a second aspect of the present invention, the object is achieved by an arrangement in a mobility controller in a radio access network. The radio access network comprises a source radio base station, at least one candidate base station being a candidate for being selected as a destination radio base station, and a mobile terminal. The mobile terminal is adapted to communicate with the source radio base station. The mobile terminal further is adapted to switch to communicate with the destination radio base station after a handover from the source radio base station to the destination radio base station. The mobility controller arrangement comprises a sending means adapted to send a request to each of the at least one candidate base stations before the handover, which request aims at measuring and reporting timing alignment, which timing alignment is to be used by the mobile terminal when communicating with the destination base station after the handover if the candidate base station becomes the destination base station after the handover. The mobility controller arrangement further comprises receiving means adapted to receive a report from each of the at least one candidate base stations before the handover. The reports comprise said requested timing alignment. The sending means further is adapted to when the destination base station is selected among the at least one candidate base stations, send a message before the handover to the mobile terminal to use said timing alignment received from the destination base station when communicating with the destination base station after the handover.

According to a third aspect of the present invention, the object is achieved by a method in a candidate base station for preparing a handover. The candidate base station is comprised in a radio access network. The radio access network comprises a source radio base station, a destination base station, a mobile terminal adapted to transmit and receive data from a source radio base station and a mobility controller adapted to control the handover. The mobile terminal further is adapted to switch to transmit and receive data from a destination radio base station after the handover. The candidate base station is a candidate for being selected as the destination base station after the handover. The method comprises the following steps to be taken before the handover: Receiving a request from the mobility controller, which request aims at measuring and reporting timing alignment, which timing alignment is to be used by the mobile terminal when transmitting data to the destination base station after the handover, if the candidate base station becomes the destination base station after the handover; measuring timing alignment by listening to the mobile terminal transmission; and sending a report to the mobility controller comprising said measured timing alignment. The report is adapted to be forwarded by the mobility controller to the mobile terminal if the candidate base station becomes the destination base station after the handover.

According to a fourth aspect of the present invention, the object is achieved by an arrangement in a candidate radio base station comprised in a radio access network. The radio access network further comprises a source radio base station, a destination base station, a mobile terminal and a mobility controller. The mobile terminal is adapted to communicate with the source radio base station. The mobile terminal further is adapted to switch to communicate with the destination radio base station after a handover from the source radio base station to the destination radio base station. The candidate base station is a candidate for being selected as the destination base station after the handover. The destination base station arrangement comprises receiving means adapted to receive a request from the mobility controller which request aims at measuring and reporting timing alignment before the handover if the candidate base station becomes the destination base station after the handover. The timing alignment is to be used by the mobile terminal when transmitting data to the destination base station after the handover. The candidate base station arrangement further comprises a measuring unit adapted to measure timing alignment by listening to the mobile terminal transmission before the handover. The destination base station arrangement further comprises a sending means adapted to send a report to the mobility controller comprising said measured timing alignment. The report is adapted to be forwarded by the mobility controller to the mobile terminal before the handover, if the candidate base station becomes the destination base station after the handover.

Since the mobility controller requests timing alignment from the each of the candidate base stations, the candidate base stations measures and reports timing alignment to the mobility controller and since the mobility controller sends a message to the mobile terminal to use the timing alignment after the handover, which steps all are taken before the handover executes, the steps of random access and synchronizing can be omitted when the handover executes. This implies that the handover execution time is reduced.

An advantage with the present invention is that the reduced handover execution time results in a shorter interruption time for data transmission during handover.

A further advantage with the present invention is that the reduced handover execution time results in improved capacity.

A further advantage with the present invention is that the reduced handover execution time results in improved coverage.

A yet further advantage with the present invention is that the reduced handover execution time results in improved cell edge bit rate.

DETAILED DESCRIPTION OF PREFERRED EMBODIMENTS

The invention is defined as a method and an arrangement which may be put into practice in the embodiments described below.

Figure 1:
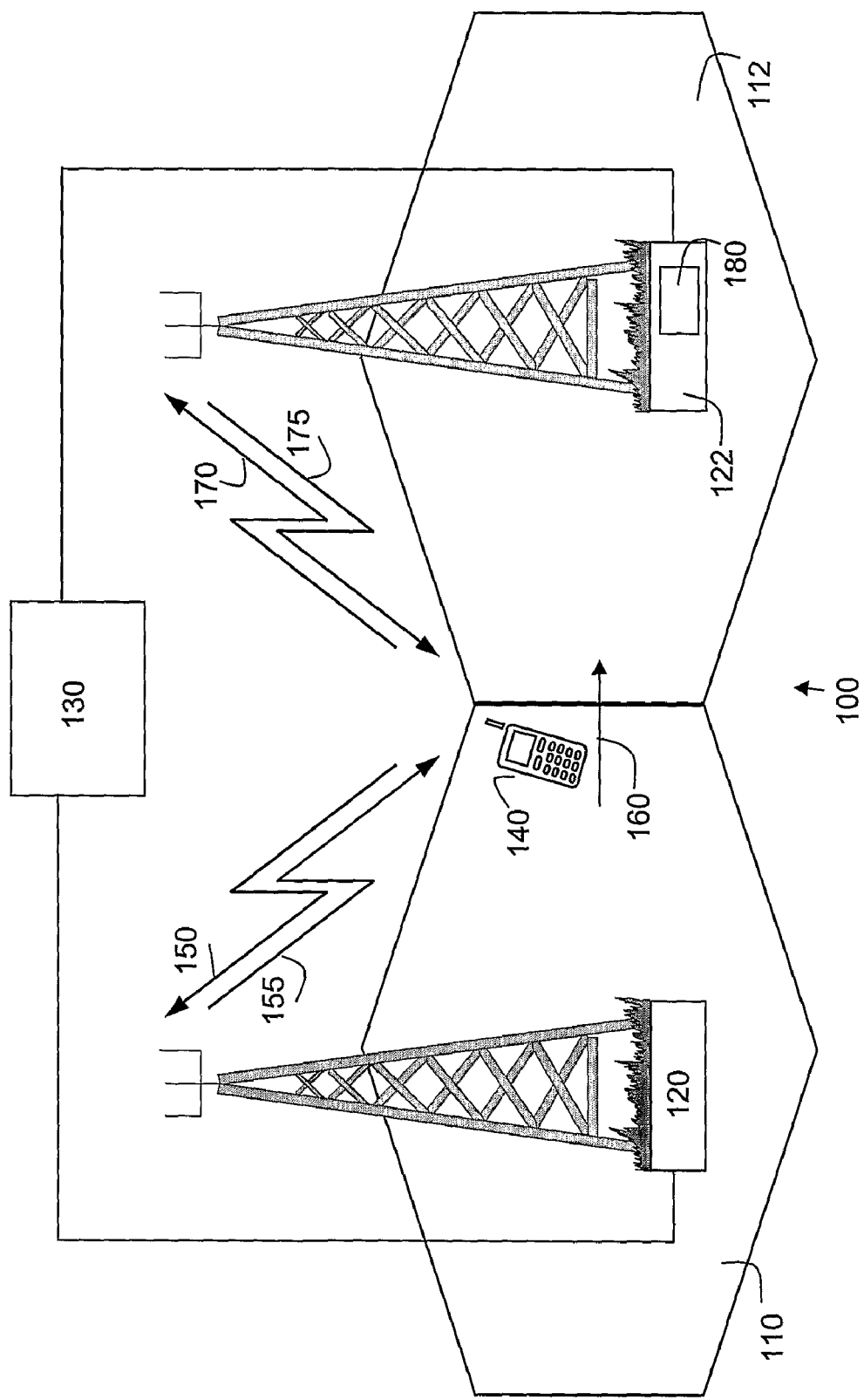
FIG. 1 is a schematic block diagram illustrating a radio access network.

FIG. 1 depicts a radio access network 100 using technologies such as e.g. Wideband Code Division Multiple Access (WCDMA) Time Division Duplex (TDD) mode Radio Access Network Long Term Evolution (RAN LTE). The radio access network 100 comprises a number of cells, whereof two cells, cell 110 and cell 112 are depicted in FIG. 1. Each of the cells is served by a radio base station such that cell 110 is served by a radio base station 120 and cell 112 is served by a radio base station 122. The cells 110, 112 and radio base stations 120, 122 are controlled by a network node 130, which network node 130 performs different controlling functionality. The different controlling functionality may also be performed by any of the radio base stations 120 and 122. A mobile terminal 140 is currently positioned in cell 110. The cell 110 is from now on referred to as the source cell 110 and the radio base station 120 is from now on referred to as the source radio base station 120. The mobile terminal 140 may be a mobile phone, a Personal Digital Assistant (PDA) or any other node that is able to communicate in a radio access network 100. The mobile terminal 140 is currently communicating in the radio access network 100 with the source radio base station 120. The mobile terminal 140 transmits on an uplink channel 150, which is referred to as the mobile terminal transmission, and receives on a downlink channel 155. The mobile terminal 140 is moving towards cell 112 which movement is pointed out by arrow 160. The cell 112 is from now on referred to as the destination cell 112 and the radio base station 122 serving the destination cell 112 is from now on referred to as the destination radio base station 122. The mobile terminal will make a handover, during which handover the mobile terminal 140 will switch from communicating with the source radio base station 120 to communicate with the destination radio base station 122 on an uplink channel 170 and a downlink channel 175. However, when the mobile terminal 140 moves, there is at least one but mostly a set of candidate base stations present whereof the destination base station 122 is one of them and the only one depicted in FIG. 1. The candidate base stations are candidates for being the destination base station after the handover. The set of candidate base stations may be created based on neighbour cell lists and downlink and uplink measurements in a conventional way. The at least one candidate base stations are comprised in the radio access network 100.

The functionality of the present method is performed by a mobility controller 180 which may be located in the base stations in the radio access network 100, in the network node 130 or any other central node such as e.g. a Radio Network Controller (RNC), a Base Station Controller (BSC), Radio Resource Management (RRM) server or Access Gateway (AGW) or in the mobile terminal 140. In the exemplary scenario, the mobility controller 180 is placed in the candidate base stations comprising the destination base station 122.

In the present method the candidate base stations comprising the destination base station synchronize to the terminal before the handover starts the execution phase to reduce the interruption time.

Figure 2:
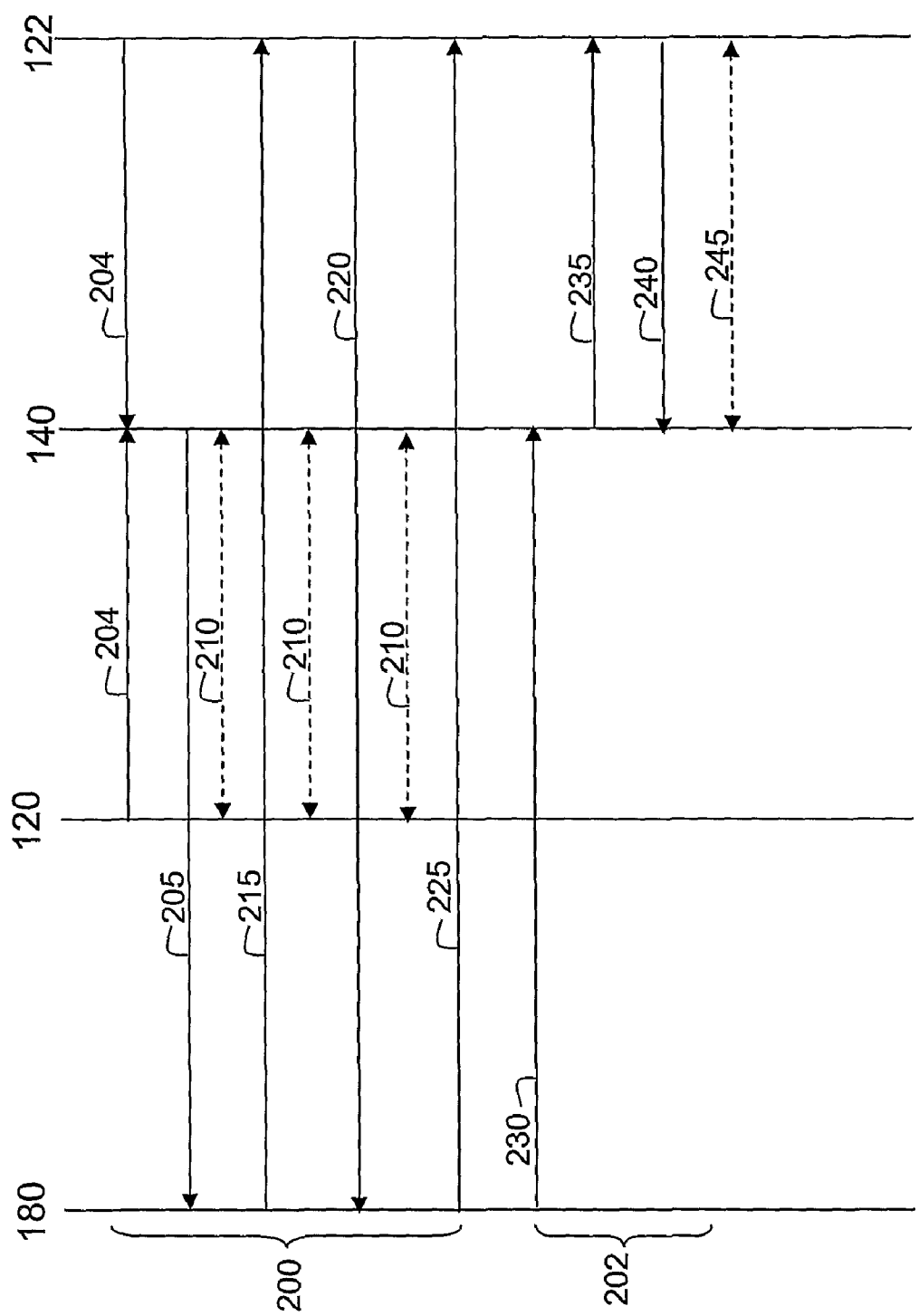
FIG. 2 is a signalling scheme illustrating a handover according to one embodiment of the present invention.

The handover process will now be described with reference to FIG. 2. FIG. 2 is a signaling scheme disclosing signals between the mobility controller 180, the source base station 120, one of the candidate base stations in this case the destination base station 122 and the mobile terminal 140. The handover phase is divided into two phases, the preparation phase 200 and the execution phase 202.

The source base station 120 and the candidate base stations comprising the destination base station 122 each sends reference signals 204. The mobile terminal 140 performs measurements regarding signal strength and quality on the reference signals 200 and sends 205 the result to the mobility controller 180. This is performed in a conventional way as described above under "Background of the invention" and it is performed during data transmissions 210 between the mobile terminal 140 and the source base station 120.

In the preparation phase the mobility controller 180 sends a request 215 to the candidate base stations comprising the destination base station 122, to measure and report a desired resource assignment for the mobile terminal 140. The desired resource assignment comprises timing alignment, but may also comprise to measure and report what power the mobile terminal 140 shall use for transmission when communicating with the destination base station 122 after the handover. The request may further comprise an order to report system information. The request 215 may also include information about the mobile terminal's 140 current timing alignment, system information and power used when communicating with the source base station 120, to simplify for candidate base stations, comprising the destination base station 122, to find and receive the signal from the mobile terminal 140. As an alternative, no request of reporting a desired resource assignment for the mobile terminal 140 is transmitted from the mobility controller 180, but instead said order to the candidate base stations may be triggered by an event such as e.g. that the candidate base stations detect the mobile terminal themselves.

The candidate base stations, comprising the destination base station 122, obtain the request 215 and each of them listen to the mobile terminal 140 transmission and measure the signal of the mobile terminal transmission. It is assumed that the candidate base stations, comprising the destination base station 122 can detect the mobile terminal transmission. To make the detection easier, the base station candidates comprising the destination base station 122 may be informed by the mobility controller 180 about the mobile terminal's 140 resource assignment such as time, frequency, power and/or spreading code of the mobile terminal 140 used when communicating with the source base station 120, on which channel and approximately when the mobile terminal 140 is transmitting. It is also possible for the source base station 122 to schedule the mobile terminal 140 so that measuring its signal for candidate base station becomes simpler. The candidate base stations comprising the destination base station 122 each create a desired resource assignment based on the signal measurement. When creating the desired resource assignment, the desired timing alignment and power may be defined based on the signal measurements and related to which timing alignment and power that currently is used in the source cell 110. E.g. the candidate base stations comprising the destination base station 122, may report to the mobility controller 130 that the desired signal shall be transmitted a specific number of micro seconds earlier or later (timing alignment) and a specific number of dB stronger or weaker (power) than the now detected mobile terminal transmission signal. Frequency and time frame may be selected among currently available. As an alternative, the desired resource assignment may be based on information about available resources within the destination cell. Such information may be the number of other mobile terminals that are communicating in the destination cell 122 which indicates the availability of resources.

The candidate base stations comprising the destination base station, sends a report 220 to the mobility controller 180, which report comprises the created desired assignment and may also comprise system information. This measurement and reporting may be performed either once, periodically, or triggered by other events as mentioned above. Note that a base station that autonomously detects a terminal may signal this to the mobility controller 180 without being explicitly ordered to.

The mobility controller 180 decides on a handover and selects which one of the set of candidate base stations the mobile terminal will be switched to, in this exemplary scenario, the mobile terminal 140 will be switched to the destination base station 122. The mobility controller 180 may send 225 to the destination base station 122, an order to use the desired resource assignment, comprising the value of timing alignment, that was created by the destination base station 122. This means that the synchronizing process is performed, i.e. that the mobile terminal 140 is informed about how much the point of time of the mobile terminal transmission has to be adjusted when starting the data transmission with the destination base station 122.

The mobility controller 180 further sends 230 to the terminal 140, the system information of the destination base station 122 and an instruction to use the desired resource assignment after the handover, which desired resource assignment was created by the destination base station 122. This signaled to the mobile terminal 140 e.g. in a handover command. When the handover command is sent, the preparation phase is terminated.

The execution phase starts when the mobile terminal receives the handover command. When the handover command is received the data transmission between the mobile terminal 140 and the source base station 120 is interrupted.

The fact that the mobile terminal 140 has synchronized to the destination base station 122 during the preparation phase 200 means that the mobile terminal 140 can omit the steps of random access and synchronizing according to timing alignment, which will shorten the execution time and the interruption. In the case when the mobile terminal 140 has received system information about the destination base station during the preparation phase 200, the mobile terminal 140 may further omit the step of reading this system information in the execution phase which will shorten the execution time and the interruption even more. In the case that the destination base station 122 has measured required power, the procedure step for this may also be omitted.

The mobile terminal then sends a scheduling request 235 to the destination base station 122. The destination base station 122 then sends a scheduling grant 240 to the mobile terminal 180. This is the end of the execution phase and the interruption of data transmission.

Based on the desired resource assignment that was created by the destination base station 122 and sent 230 to the mobile terminal 140 from the mobility controller 180, the mobile terminal 140 can start data transmission 245 to the destination base station 122.

Figure 3:
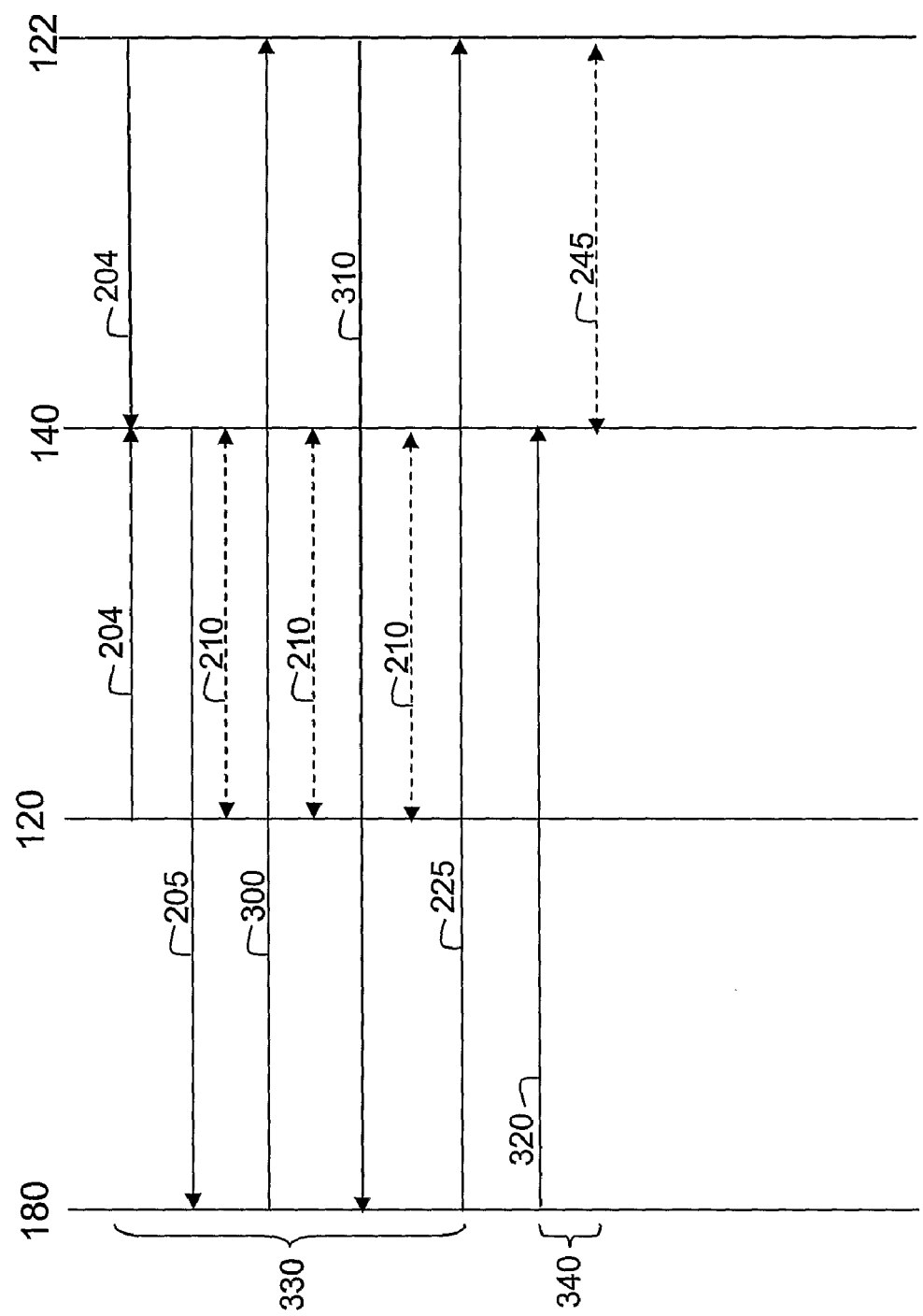
FIG. 3 is a signalling scheme illustrating a handover according to another embodiment of the present invention.

A variant of the embodiment disclosed in FIG. 2 is depicted in a signaling scheme FIG. 3. Many features of the alternative embodiment in FIG. 3 are the same as the embodiment depicted in FIG. 2, these feature reference numbers are the same also in FIG. 3. The features that are different will now be described. In this alternative embodiment the request to measure and report a desired resource assignment additionally comprises a request for resource allocation such as time, frequency, spreading code, similar to a scheduling request. This enlarged request is sent 300 by the mobility controller 180 to the candidate base stations comprising the destination base station 122. Each of the candidate base stations comprising the destination base station 122 additionally pre-allocate recourses. A scheduling grant comprising information about the pre-allocated recourses is added to the report which also comprises the created desired assignment and possibly also system information which is sent 310 to the mobility controller 180. The scheduling grant is forwarded from the mobility controller 180 to the mobile terminal 140, possibly in the handover command 320. The scheduling process is performed in the preparation phase 330 and thanks to that the time of the execution phase 340 and also the interruption will be shortened even more.

The present method steps in the mobility controller 180 for preparing a handover will now be described with reference to a flow chart depicted in FIG. 4. The method steps will be taken during data transmission between the mobile terminal 140 and the source base station 120 before the handover.

401. The Mobility controller 180 sends a request to each of the candidate base stations comprising the destination base station 122. The request aims at measuring and reporting timing alignment that is to be used by the mobile terminal 140 when communicating with the destination base station after the handover if the candidate base station becomes the destination base station 122 after the handover. The request may further aim at reporting system information about the candidate base stations comprising the destination base station 122 and/or at pre-allocate some resources to be used for communication between the mobile terminal 140 and the destination base station after the handover if the candidate base station becomes the destination base station 122 after the handover. The request may further aims at measuring what power the mobile terminal 140 shall use for transmission when communicating with the destination base station after the handover if the candidate base station becomes the destination base station (122) after the handover.

402. The mobility controller 180 receives a report from each of the candidate base stations comprising the destination base station 122, the report comprising said requested timing alignment. The reports may further comprise said requested system information and/or a scheduling grant comprising information that resources are pre-allocated by the destination base station. The report further may comprise said requested power.

403. When the destination base station 122 is selected among the at least one candidate base stations, the mobility controller 180 sends a message to the mobile terminal 140 to use said timing alignment and possibly system information and/or said scheduling grant and/or measured required power received from the destination base station 122, when communicating with the destination base station after the handover.

Figure 5:
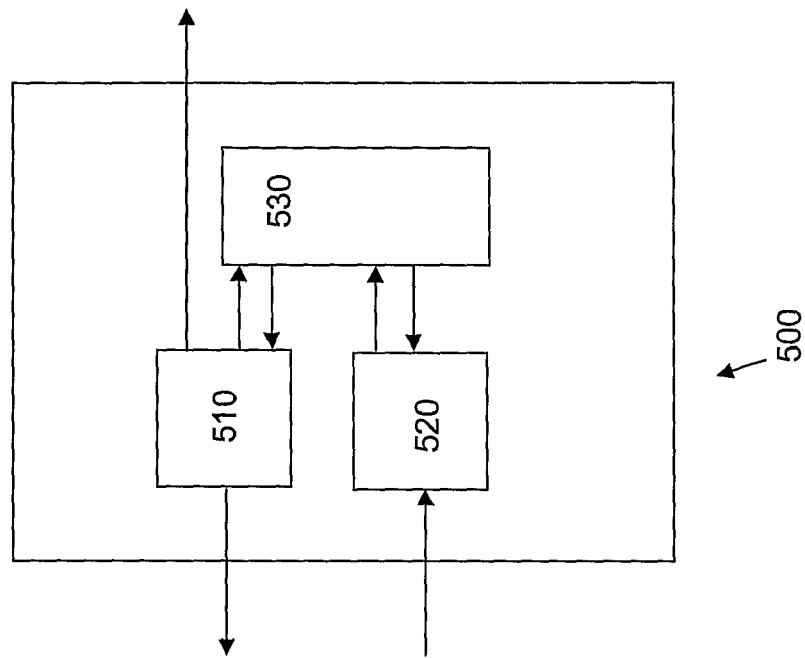
FIG. 5 is a schematic block diagram illustrating an arrangement in a mobility controller within the radio access network.
Figure 4:
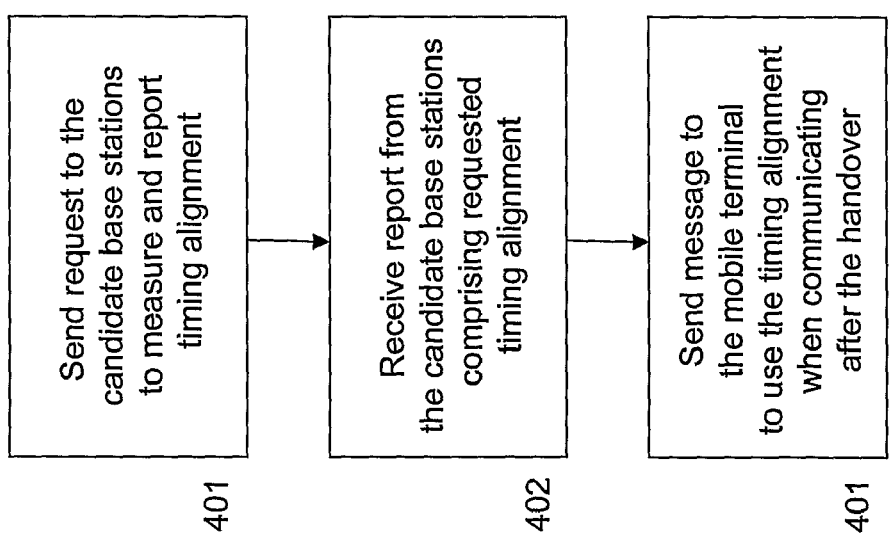
FIG. 4 is a flow chart illustrating a method for preparing a handover in a mobility controller within the radio access network.

To perform the present method steps referred to in FIG. 4, the mobility controller 180 comprises an arrangement 500 as depicted in FIG. 5.

The mobility controller arrangement 500 comprises a sending means 510 adapted to send a request to each of the at least one candidate base stations comprising the destination base station 122, before the handover. The request aims at measuring and reporting timing alignment, which timing alignment is to be used by the mobile terminal 140 when communicating with the destination base station after the handover. The request may further aim at reporting system information about the candidate base stations comprising the destination base station 122 and/or aims at pre-allocate some resources to be for communication between the mobile terminal 140 and the destination base station after the handover if the candidate base station becomes the destination base station 122 after the handover.

The mobility controller arrangement 500 further comprises receiving means 520 adapted to receive a report from the candidate base stations comprising the destination base station 122, before the handover. The report comprises said requested timing alignment and may further comprise said requested system information and/or a scheduling grant comprising information that resources are pre-allocated.

The sending means 510 is further adapted to, when the destination base station 122 is selected among the at least one candidate base stations, send a message before the handover to the mobile terminal 140 to use said timing alignment received from the destination base station 122 when communicating with the destination base station 122 after the handover. The message may further comprise said system information received from the destination base station 122, which system information the mobile terminal will use when communicating with the destination base station after the handover and/or said scheduling grant received from the destination base station 122.

The mobility controller arrangement 500 may be comprised in any base station within the radio access network.

The present method steps in the candidate base station for preparing a handover will now be described with reference to a flow chart depicted in FIG. 6. The method steps will be taken during data transmission between the mobile terminal 140 and the source base station 120 before the handover.

601. The candidate base station receives a request from the mobility controller 180. The request aims at measuring and reporting timing alignment, which timing alignment is to be used by the mobile terminal 140 when transmitting data from the destination base station 122 after the handover if the candidate base station becomes the destination base station 122 after the handover. The request received from the mobility controller 180 may further aims at reporting system information about the destination base station 122 and/or at pre-allocate some resources to be used for communication between the mobile terminal 140 and the destination base station 122 after the handover if the candidate base station becomes the destination base station 122 after the handover. The request may further aim at measuring what power the mobile terminal 140 shall use for transmission when communicating with the destination base station 122 after the handover if the candidate base station becomes the destination base station 122 after the handover.

602. The candidate base station measures timing alignment by listening to the mobile terminal 140 transmission and may further measure the required power by listening to the mobile terminal 140 transmission. The candidate base station may also pre-allocate resources for communication with the mobile terminal 140.

603. The candidate base station sends a report to the mobility controller 180 comprising said measured timing alignment. The report may further comprise said system information and/or a scheduling grant comprising information that resources are pre-allocated. The report may further comprise said required power. The timing alignment, pre-allocated resources, system information and required power are adapted to be used by the mobile terminal 140 when communicating with the destination base station 122 after the handover if the candidate base station becomes the destination base station 122 after the handover.

Figure 7:
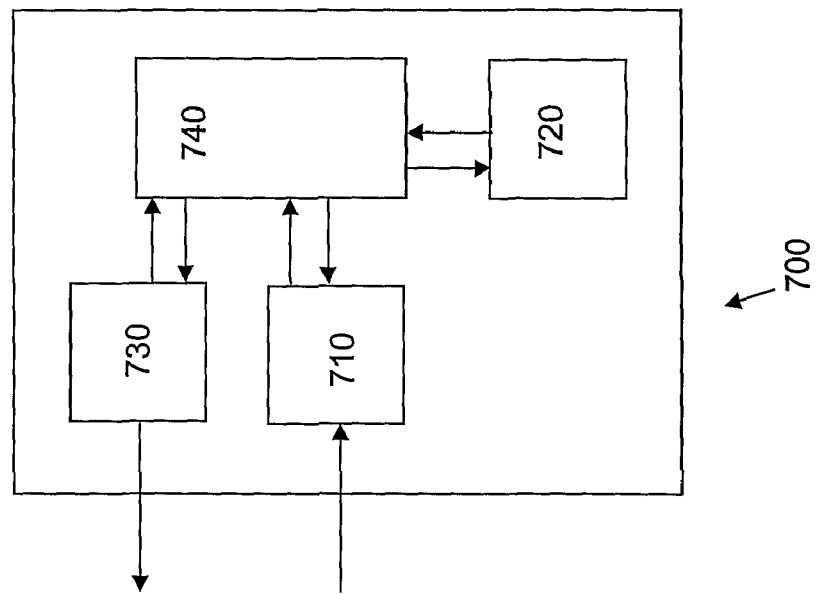
FIG. 7 is a schematic block diagram illustrating an arrangement in a candidate base station within the radio access network.
Figure 6:
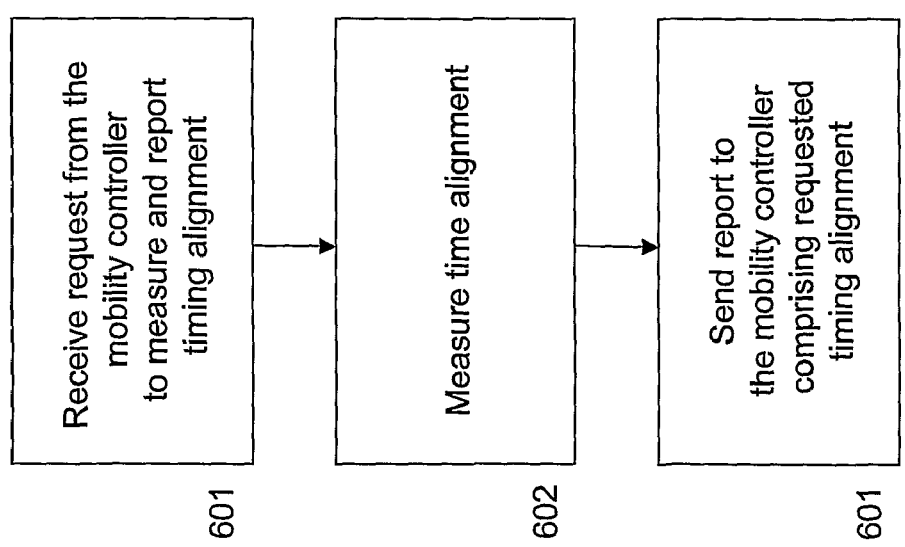
FIG. 6 is a flow chart illustrating a method for preparing a handover in a candidate base station within the radio access network.

To perform the present method steps referred to in FIG. 6, the candidate base station comprises an arrangement 700 as depicted in FIG. 7.

The candidate base station arrangement 700 comprises receiving means 710 adapted to receive a request from the mobility controller 180. The request aims at measuring and reporting timing alignment, which timing alignment is to be used by the mobile terminal 140 when transmitting data from the destination base station 122 after the handover if the candidate base station becomes the destination base station 122 after the handover. The candidate base station arrangement 700 further comprising a measuring unit 720 adapted to measure timing alignment by listening to the mobile terminal 140 transmission. The candidate base station arrangement 700 further comprises a sending means 730 adapted to send a report to the mobility controller 180 comprising said measured timing alignment. The report is adapted to be forwarded by the mobility controller 180 to the mobile terminal 140 and which timing alignment is adapted to be used by the mobile terminal 140 when communicating with the destination base station 122 after the handover if the candidate base station becomes the destination base station (122) after the handover.

The present handover preparation mechanism can be implemented through one or more processors, such as the processor 530 in the mobility controller arrangement depicted in FIG. 5 and/or the processor 740 in the candidate base station arrangement depicted in FIG. 7, together with computer program code for performing the functions of the invention. The program code mentioned above may also be provided as a computer program product, for instance in the form of a data carrier carrying computer program code for performing the present method when being loaded into the mobility controller 180 and/or the candidate base station 122. One such carrier may be in the form of a CD ROM disc. It is however feasible with other data carriers such as a memory stick. The computer program code can furthermore be provided as pure program code on a server and downloaded to the mobility controller 180 and/or the candidate base station 122 remotely.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method of preparing a handover using a mobility controller in a radio access network, the radio access network comprising a source radio base station, a plurality of candidate base stations that are candidates for being selected as a destination radio base station, and a mobile terminal configured to communicate with the source radio base station, the mobile terminal further configured to switch to communicate with the destination radio base station after the handover, the method comprising the following steps during data transmission between the mobile terminal and the source base station before the handover:

sending a request to each of the candidate base stations to measure and report timing alignment, wherein the timing alignment is to be used by the mobile terminal when communicating with the destination base station after the handover;

receiving a report from each of the candidate base stations, the report comprising the requested timing alignment; and responsive to the destination base station being selected among the candidate base stations, sending a message to the mobile terminal to use the timing alignment received from the destination base station when communicating with the destination base station after the handover.

2. The method of claim 1, wherein:

the request sent to the candidate base stations further comprises a request to report system information about the candidate base stations;

the report received from the candidate base stations further comprises the requested system information; and the message sent to the mobile terminal further comprises the system information.

3. The method of claim 1, wherein:
the request sent to the candidate base stations further comprises a request regarding allocation of resources to be used for communication between the mobile terminal and the destination base station after the handover;
the report received from the candidate base stations further comprises a scheduling grant comprising information about pre-allocated resources; and
the message sent to the mobile terminal further comprises the scheduling grant.

4. The method of claim 1, wherein:
the request sent to the candidate base stations further comprises a request to measure an amount of power the mobile terminal shall use for transmission when communicating with the destination base station after the handover;
the report received from the candidate base stations further comprises the requested measured power; and
the message sent to the mobile terminal further comprises the measured power.

5. The method of claim 1, wherein the request further includes information relating to resource assignment, the information including information relating to at least one of time, frequency, power, or spreading code of the mobile terminal used when the mobile terminal is communicating with the source base station.

6. The method of claim 1, wherein one of the candidate base stations comprises the mobility controller.

7. The method of claim 1, wherein receiving a report from each of the candidate base stations comprises receiving a report that includes the requested timing alignment from each of the candidate base stations before the mobility controller selects one of the candidate base stations as the destination base station.

8. An arrangement in a mobility controller in a radio access network, the radio access network comprising a source radio base station, a plurality of candidate base stations that are candidates for being selected as a destination radio base station, and a mobile terminal, the mobile terminal being configured to communicate with the source radio base station, the mobile terminal further being configured to switch to communicate with the destination radio base station after a handover from the source radio base station to the destination radio base station, the mobility controller arrangement comprising:
a transmitter configured to send a request to each of the candidate base stations, before the handover, to measure and report timing alignment, wherein the timing alignment is to be used by the mobile terminal when communicating with the destination base station after the handover; and
a receiver configured to receive a report from each of the candidate base stations before the handover, each report comprising the requested timing alignment,
wherein the transmitter is further configured to send, in response to the destination base station being selected among the candidate base stations, a message to the mobile terminal, before the handover, to use the timing alignment received from the destination base station when communicating with the destination base station after the handover.

9. The arrangement of claim 8, wherein:
the request sent to the candidate base stations further comprises a request to report system information about the candidate base stations;
the report received from the candidate base stations further comprises the requested system information;
the message sent to the mobile terminal further comprises the system information; and
the system information is to be used by the mobile terminal when communicating with the destination base station after the handover.

10. The arrangement of claim 8, wherein:
the request sent to the candidate base stations further comprises a request for pre-allocated resources to be used for communication between the mobile terminal and the destination base station after the handover;
the report received from the candidate base stations further comprises a scheduling grant comprising information about the pre-allocated resources; and
the message sent to the mobile terminal further comprises the scheduling grant.

11. A base station, comprising:
a mobility controller arrangement in a radio access network, the radio access network comprising a source radio base station, a plurality of candidate base stations that are candidates for being selected as a destination radio base station, and a mobile terminal that is configured to communicate with the source radio base station and to switch to communicate with the destination radio base station after a handover from the source radio base station to the destination radio base station, the mobility controller arrangement comprising:
a transmitter configured to send a request to each of the candidate base stations, before the handover to measure and report timing alignment, wherein the timing alignment is to be used by the mobile terminal when communicating with the destination base station after the handover; and
a receiver configured to receive a report from each of the candidate base stations before the handover, each report comprising the requested timing alignment,
wherein the transmitter is further configured to send, in response to the destination base station being selected among the candidate base stations, a message to the mobile terminal, before the handover, to use the timing alignment received from the destination base station when communicating with the destination base station after the handover.

12. for A method of preparing a handover using a candidate base station that is among a plurality of candidates for being selected as a destination base station after the handover in a radio access network, the radio access network comprising a source radio base station, the destination base station, a mobile terminal configured to transmit data to and receive data from the source radio base station, and a mobility controller configured to control the handover, the mobile terminal being further configured to switch to transmit and receive data from the destination radio base station after the handover, the method comprising:
receiving, prior to the handover, a request from the mobility controller to measure and report timing alignment, wherein the timing alignment is to be used by the mobile terminal when transmitting data to the destination base station after the handover, and wherein the request is sent to each of the candidates;
measuring, prior to the handover, the timing alignment by listening to the mobile terminal transmission; and
sending, prior to the handover, a report to the mobility controller comprising the measured timing alignment, the report to be forwarded by the mobility controller to the mobile terminal after the handover.

13. The method of claim 12, wherein:

the request received from the mobility controller further comprises a request to report system information about the candidate base station;

the report sent to the mobility controller further comprises the system Information; and the system information is to be used by the mobile terminal when communicating with the destination base station after the handover.

14. The method of claim 12, wherein:

the request received from the mobility controller further comprises a request for pre-allocated resources to be used for communication between the mobile terminal and the destination base station after the handover;

the measuring comprises pre-allocating resources for communication with the mobile terminal;

the report, sent to the mobility controller to be forwarded to the mobile terminal, further comprises a scheduling grant comprising information about the pre-allocated resources; and the pre-allocated resources are to be used by the mobile terminal when communicating with the destination base station after the handover.

15. The method of claim 12, wherein:

the request received from the mobility controller further comprises a request to measure an amount of power the mobile terminal is to use for transmission when communicating with the destination base station after the handover;

the measuring further comprises measuring the power by listening to the mobile terminal transmission; and the report sent to the mobility controller further comprises information identifying the power, and the information identifying the power is to be forwarded to and used by the mobile terminal when communicating with the destination base station after the handover.

16. An arrangement in a candidate radio base station in a radio access network comprising a source radio base station, a destination base station, a mobile terminal, and a mobility controller, the mobile terminal being configured to communicate with the source radio base station and to switch to communicate with the destination radio base station after a handover from the source radio base station to the destination radio base station, the candidate base station being among a plurality of candidates for being selected as the destination base station after the handover, the candidate base station arrangement comprising:

a receiver configured to receive a request from the mobility controller before the handover, the request comprising a request to measure and report timing alignment, wherein the timing alignment is to be used by the mobile terminal when transmitting data to the destination base station after the handover, and wherein the request is sent to each of the candidates;

a measuring unit configured to measure timing alignment by listening to the mobile terminal transmission before the handover; and a transmitter configured to send a report to the mobility controller, the report comprising the measured timing alignment, wherein the report is to be forwarded by the mobility controller to the mobile terminal before the handover.

* * * * *

UNITED STATES PATENT AND TRADEMARK OFFICE
CERTIFICATE OF CORRECTION

| | | |
|---|---|---|
| PATENT NO. | : 8,355,411 B2 | Page 1 of 1 |
| APPLICATION NO. | : 12/307257 | |
| DATED | : January 15, 2013 | |
| INVENTOR(S) | : Simonsson et al. | |

It is certified that error appears in the above-identified patent and that said Letters Patent is hereby corrected as shown below:

In the Claims:

In Column 13, Line 6, in Claim 13, delete "Information;" and insert -- information; --, therefor.

In Column 13, Line 18, in Claim 14, delete "report, sent" and insert -- report sent --, therefor.

Signed and Sealed this
Fourteenth Day of May, 2013

Teresa Stanek Rea
*Acting Director of the United States Patent and Trademark Office*